United States Patent
Kang (10) Patent No.: US 9,655,173 B2
(45) Date of Patent: May 16, 2017

(54) MICROWAVE OVEN USING OHMIC HEATING

(71) Applicant: Dongbu Daewoo Electronics Corporation, Seoul (KR)

(72) Inventor: Dong Hoon Kang, Seoul (KR)

(73) Assignee: Dongbu Daewoo Electronics Corporation, Seoul (KR)

( * ) Notice: Subject to any disclaimer, the term of this patent is extended or adjusted under 35 U.S.C. 154(b) by 257 days.

(21) Appl. No.: 14/183,294

(22) Filed: Feb. 18, 2014

(65) Prior Publication Data

US 2015/0189702 A1    Jul. 2, 2015

(30) Foreign Application Priority Data

Dec. 26, 2013  (KR) .................. 10-2013-0163801

(51) Int. Cl.
*H05B 6/64* (2006.01)
*H05B 3/00* (2006.01)
*H05B 6/68* (2006.01)
*A23L 5/10* (2016.01)

(52) U.S. Cl.
CPC ............. *H05B 6/647* (2013.01); *A23L 5/15* (2016.08); *H05B 3/0004* (2013.01); *H05B 6/6411* (2013.01); *H05B 6/688* (2013.01)

(58) Field of Classification Search
CPC ...... H05B 6/647; H05B 6/6411; H05B 6/688; H05B 6/62; H05B 3/0004; A23L 1/0128
See application file for complete search history.

(56) References Cited

U.S. PATENT DOCUMENTS

| 4,296,299 | A | * | 10/1981 | Stottmann | ............... | H05B 6/62 |
| | | | | | | 219/771 |
| 4,460,814 | A | * | 7/1984 | Diesch | ................ | H05B 6/6452 |
| | | | | | | 219/725 |
| 4,910,371 | A | * | 3/1990 | Brun | ....................... | H05B 6/62 |
| | | | | | | 219/771 |
| 5,151,569 | A | * | 9/1992 | Suh | ......................... | H05B 6/74 |
| | | | | | | 219/751 |
| 6,576,116 | B2 | | 6/2003 | Carrigan et al. | | |
| 7,368,685 | B2 | * | 5/2008 | Nam | ..................... | H05B 6/6408 |
| | | | | | | 219/403 |

FOREIGN PATENT DOCUMENTS

| JP | 08255682 A | * 10/1996 | ............... H05B 6/62 |
| JP | 2003-45640 | 2/2003 | |
| KR | 20-1999-0024530 U | 7/1999 | |
| KR | 10-0346158 | 11/2002 | |
| KR | 10-1115024 | 2/2012 | |

OTHER PUBLICATIONS

English translation JP 08255682; Fujii, pp. 1-12; Jan. 2001.*
Korean Patent Abstracts, Registration No. 10-1115024, Published Feb. 3, 2012, KIPO, Republic of Korea.

* cited by examiner

*Primary Examiner* — Steven Leff (57) ABSTRACT

A microwave oven that includes a power supply and a heating bar connected to the power supply is described. The heating bar is configured to receive an electric current from the power supply, and to apply the current to food. The electric current applied from the heating bar passes through the food thereby heating up the food.

20 Claims, 7 Drawing Sheets

MICROWAVE OVEN USING OHMIC HEATING

CROSS-REFERENCE TO RELATED APPLICATIONS

This application is based on and claims priority to Korean Patent Application No. 10-2013-0163801, filed on Dec. 11, 2013, the disclosure of which is incorporated herein in its entirety by reference.

TECHNICAL FIELD

The present invention relates to a microwave oven which uses an ohmic heating process. More particularly, the present invention relates to a microwave oven capable of heating up food with a heating bar using an ohmic heating process.

BACKGROUND

Microwave ovens are used to heat food. More specifically, a magnetron included in a microwave oven generates electromagnetic waves, which in turn vibrate water molecules contained in the food, which in turn heats the food.

The aforementioned heating system is called a dielectric heating system, and is used in a conventional microwave oven to heat food. However, when a microwave oven employs a dielectric heating system, food to be heated may not be heated uniformly because the degree of absorption of the electromagnetic waves may differ from one part to another in food.

Therefore, there is a need for a microwave oven that utilizes a heating system that is capable of uniformly heating food.

Examples of conventional microwave ovens may be disclosed in Korean Patent No. 1115024 (Issued on Mar. 6, 2012) and in Korean Patent No. 6576116 (Issued on Jun. 10, 2003).

SUMMARY

In view of the foregoing, it is an object of one or more embodiments of the present invention to provide a microwave oven that is capable of heating food using ohmic heating.

However, the object of one or more embodiments of the present invention is not limited to the above and encompasses other objects that will be understood by those skilled in the art from the following description.

In accordance with one or more embodiments of the present invention, there is provided a microwave oven comprising: a power supply, and a heating bar connected to the power supply, the heating bar configured to receive electric current from the power supply and to apply it to food to be heated, wherein the electric current applied from the heating bar passes through the food.

The heating bar is configured to contact the food to be heated by extending the heating bar, and not to contact the food by retracting the heating bar.

The microwave oven may further comprise a magnetron configured to generate microwaves.

The food is heated using at least one of ohmic heating (whereby the electric current passes through the food to be heated), or dielectric heating (whereby electromagnetic waves are absorbed by the food to be heated).

The microwave oven may further comprise an input unit configured to receive a selection of at least one of the ohmic heating and the dielectric heating, a motor configured to rotate the heating bar, and/or a cooking tray configured to rotate the food to be heated thereon.

In one or more embodiments, the cooking tray may be configured to rotate at the same angular speed as the heating bar, which is rotated by the motor. Alternatively, the cooking tray may be configured to rotate in a direction opposite to the rotation direction of the heating bar, or in both directions (e.g., depending on a manufacturer's and/or user's preference).

In accordance with one or more embodiments of the present invention, it is possible to uniformly heat food by providing a microwave oven that also uses ohmic heating.

BRIEF DESCRIPTION OF THE DRAWINGS

The above and other objects and features of the present invention will become apparent from the following description of various embodiments given in conjunction with the accompanying drawings, in which.

DETAILED DESCRIPTION

Embodiments of the present invention will be described in detail with reference to the accompanying drawings hereinafter.

In the following description, well-known functions or constitutions will not be described in detail if they would unnecessarily obscure the features of the present invention. Hereinafter, exemplary embodiments of the invention will be described with reference to the accompanying drawings.

Figure 1:
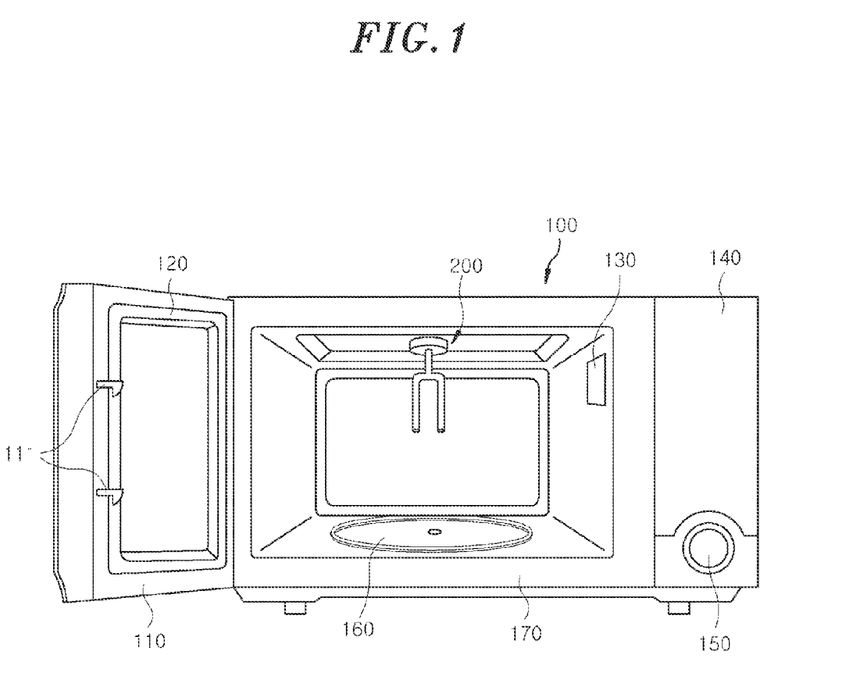
FIG. 1 shows a microwave oven using ohmic heating in accordance with one or more embodiments of the present invention.

FIG. 1 shows a microwave oven that uses ohmic heating in accordance with one or more embodiments of the present invention.

Referring to FIG. 1, a microwave oven 100 using ohmic heating of one or more exemplary embodiments may include a door 110, a door latch 111, a door seal 120, a lamp 130, a control panel 140, a door opening button 150, a cooking tray 160, a microwave oven frame 170, and an ohmic heating unit 200.

The door 110, the door latch 111, the door seal 120, the lamp 130, the door opening button 150, the cooking tray 160, and the microwave oven frame 170 are commonly employed components of a typical microwave oven, and therefore, the detailed description thereof will be omitted for the sake of simplicity of the disclosure.

The control panel 140 may receive or output signals relevant to the operations of the microwave oven 100. Further details of the control panel 140 will be later discussed with reference to FIG. 5.

The ohmic heating unit 200 may heat up food by applying electric current to the food. Specifically, the microwave oven 100 of one or more exemplary embodiments may heat the food using ohmic heating from or with the ohmic heating unit 200. The details of ohmic heating unit 200 will be described with reference to FIGS. 2A and 2B as follows.

Figure 2A:
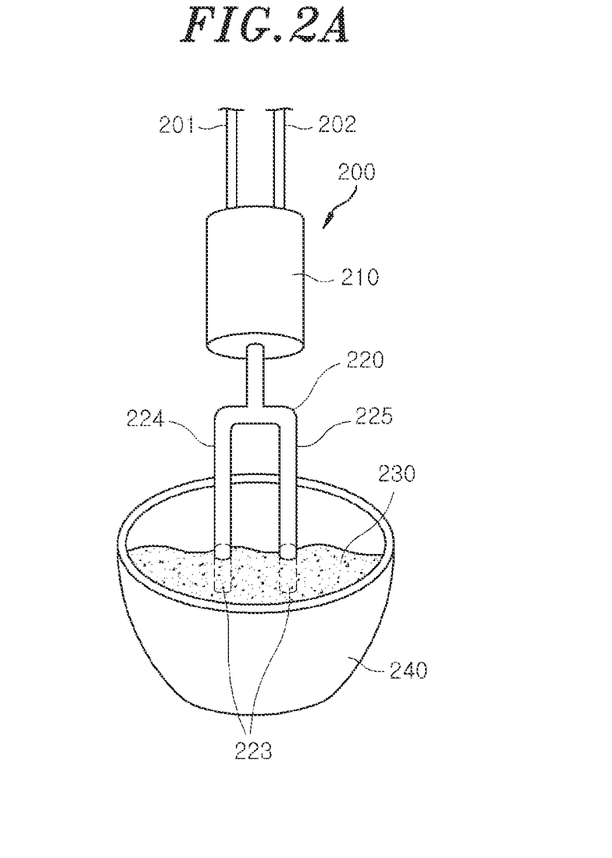
FIG. 2A illustrates ohmic heating of food using a microwave oven in accordance with one or one or more embodiments of the present invention.
Figure 2B:
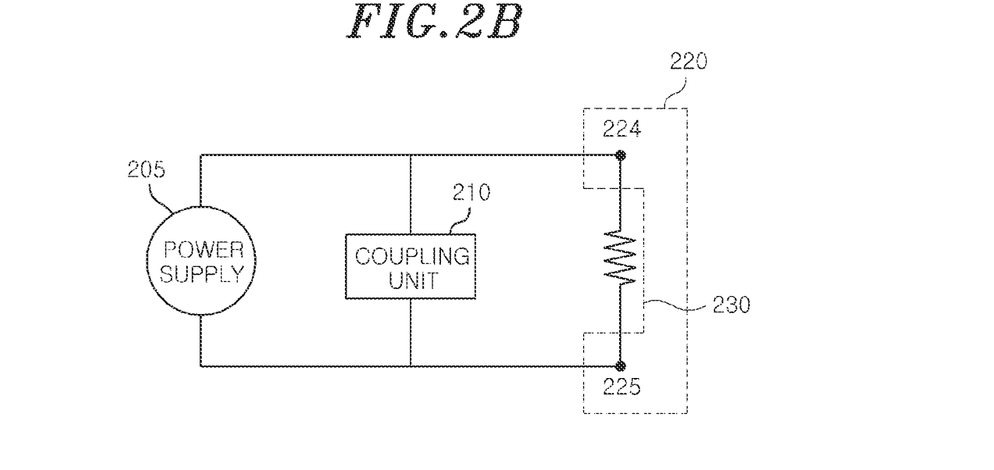
FIG. 2B presents an electrical circuit diagram representing the ohmic heating shown in FIG. 2A.

FIG. 2A illustrates ohmic heating of food using a microwave oven in accordance with one or more embodiments of the present invention, and FIG. 2B presents an electrical circuit diagram representing the ohmic heating shown in FIG. 2A.

The term "ohmic heating" used herein refers to a process of heating food using heat generated by an electric current applied to a food including a liquid having a certain resistivity. For example, water in many foods has a resistivity of $10^{-2}$ to about 1 ohm-meter, so food including appreciable amounts of water can have acceptable conductivity and/or resistivity for ohmic heating. In the ohmic heating process, the electric current passes through food, and thus, the food can be heated more uniformly, unlike in some dielectric heating processes. For similar reasons, the present microwave oven and method may employ resistive heating, which operates according to a similar mechanism (e.g., a current is passed through one or more wires or electrodes in a corresponding heating bar, and the thermal energy generated by the resistance of the wire[s] or electrode[s] in the heating bar is transmitted to the food), but which does not rely on the food having a particular conductivity and/or resistivity.

Referring to FIG. 2A, the microwave oven 100 in accordance with one or more embodiments of the present invention may comprise the ohmic heating unit 200, and the ohmic heating unit 200 may include a heating bar 220 that includes a first electrode 224 and a second electrode 225.

The microwave oven 100 in accordance with one or more embodiments of the present invention may heat food 230 using the ohmic heating unit 200 as follows. First, referring to FIG. 2A, electric current supplied through power supply lines 201 and 202 is delivered to the heating bar 220. The electric current delivered to the ohmic heating unit 200 passes through the food 230 between the first electrode 224 and the second electrode 225, and generates heat in the food 230. Therefore, the food 230 can be heated by the current.

In one or more embodiments, the ohmic heating unit 200 can be kept clean by wrapping it in foil or another material (such as plastic wrap or other material that can be found in a general microwave oven owner's manual as acceptable); by manual cleaning, especially when coated with oil and/or Teflon or other non-stick coating; and by high pressure air and/or UV radiation (in which case the oven may further comprise a high pressure air source and outlet configured to direct a stream of high-velocity air onto the heating unit 200, and/or UV radiation source configured to irradiate the exterior of the heating unit 200 with UV radiation). In one or more embodiments, the ohmic heating unit 200 may be detachable (e.g., to facilitate cleaning).

In one or more embodiments, the ohmic heating unit 200 may include multiple rods with the same or different spacing from a center rod (e.g., the rod that is inserted into the top panel of the oven and/or driven by the corresponding motor). In one or more embodiments, a temperature sensor may be in one or more of the rods of the ohmic heating unit 200. In one or more alternate embodiments, the temperature sensor can be in and/or on a probe which can extend or be placed away from the ohmic heating unit 200 to avoid interference from the ohmic heating unit 200. In one or more embodiments, the internal temperature to which a food type is heated can be empirically estimated and/or determined (e.g., from experiments on standard food types and amounts, conducted by the manufacturer). For example, the estimation and/or determination may be based on temperatures taken from a number of different samples of a predetermined amount or portion of the food type, heated at predetermined settings (e.g., power and time). Stored settings for heating a certain food type (e.g., chicken, potatoes, pizza, fish, frozen food, etc.) may be identified and/or retrieved from memory based on a user-entered or—selected food type to be heated.

FIG. 2B shows an electrical circuit diagram representing the ohmic heating operation shown in FIG. 2A. Referring to FIG. 2B, the electric current supplied from a power supply 205 (not shown in FIG. 2A) may be applied to the heating bar 220. The current applied to the ohmic heating unit 200 passes through the food 230 between the first electrode 224 and the second electrode 225 and having a certain resistivity, to generate heat in the food 230. Therefore, the food 230 can be heated by the current and/or the generated heat.

The ohmic heating unit 200 may further include a coupling member 210. The coupling member 210 may be coupled between the power supply 205 and the heating bar 220 (serially or in parallel) and may include a motor. The motor may activate the rotation of the heating bar 220.

The microwave oven 100 in accordance with one or more embodiments of the present invention may heat up food by either dielectric heating and/or ohmic heating. To this end, the control panel 140 of the microwave oven 100 may include a button to select either dielectric heating or ohmic heating, or both dielectric and ohmic heating.

Figure 3A:
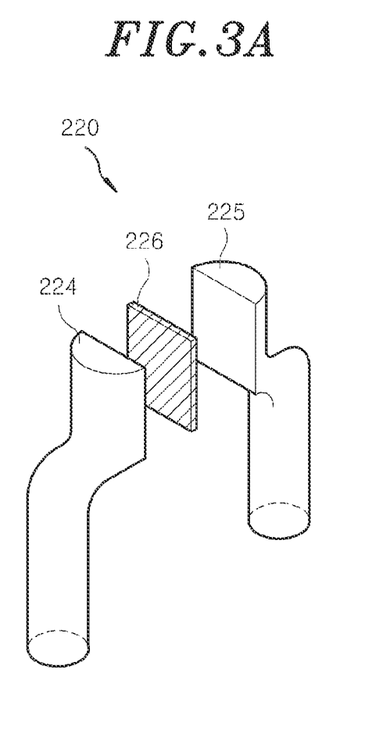
FIG. 3A to FIG. 3C show heating bars included in a microwave oven in accordance with embodiments of the present invention.
Figure 3B:
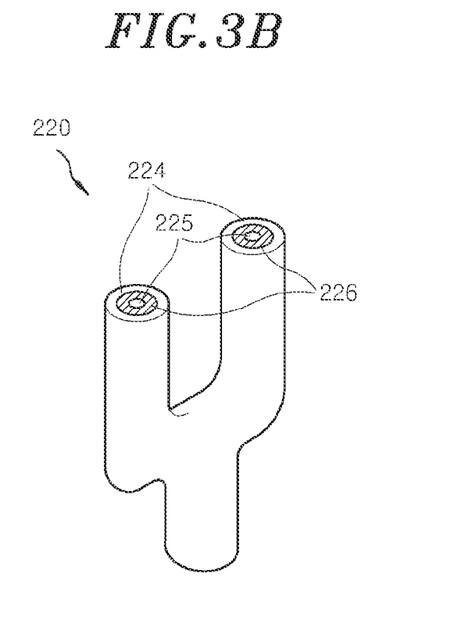
Figure 3C:
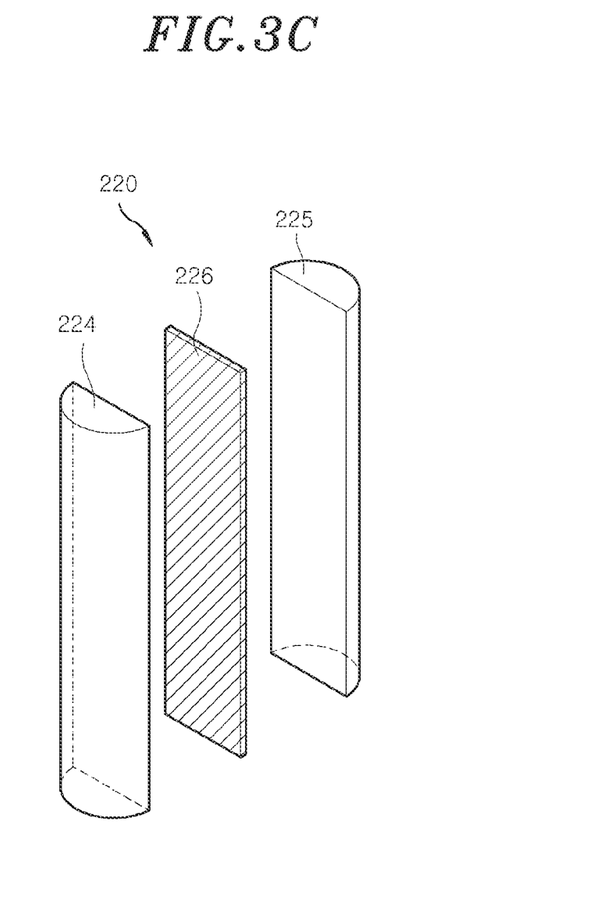

FIGS. 3A to 3C show heating bars included in a microwave oven in accordance with an embodiment of the present invention. FIGS. 3A to 3C show illustrative examples of the heating bar 220 according to embodiments of the invention, and are not intended to exclude other types of the heating bars.

As mentioned above, the food 230 to be heated may be heated by the heating bar 220 including the first electrode 224 and the second electrode 225 that are brought into contact with the food and apply electric current thereto. The heating bar 220 may further include an electrode insulator 226. The electrode insulator 226 may isolate the first electrode 224 from the second electrode 225 of the heating bar 220. However, the electrode insulator 226 may be removed from the heating bar 220 if the first electrode 224 and the second electrode 225 can be isolated from each other without the aid of the electrode insulator 226.

FIGS. 3A to 3C illustrate exemplary diagrams of the heating bar 220 comprising the first electrode 224, the second electrode 225, and the electrode insulator 226. Electric current may pass through the food 230 placed between the first electrode 224 and the second electrode 225 as illustrated in FIGS. 3A to 3C.

Figure 4A:
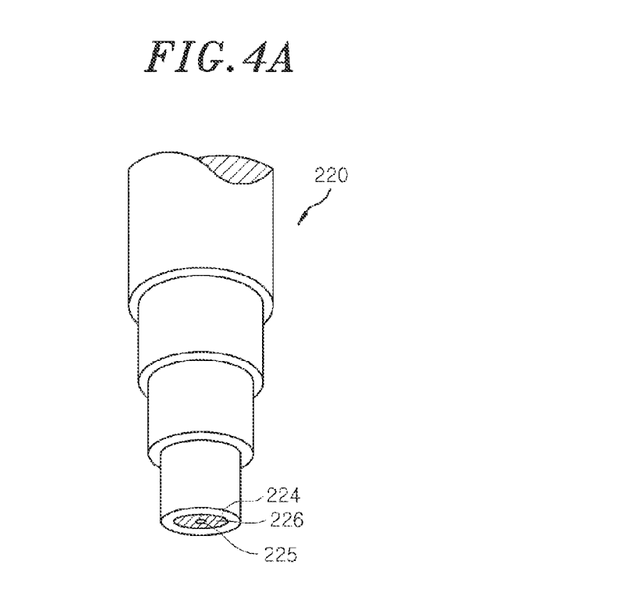
FIG. 4A to FIG. 4C depict length-adjustable heating bars included in a microwave oven in accordance with embodiments of the present invention.
Figure 4B:
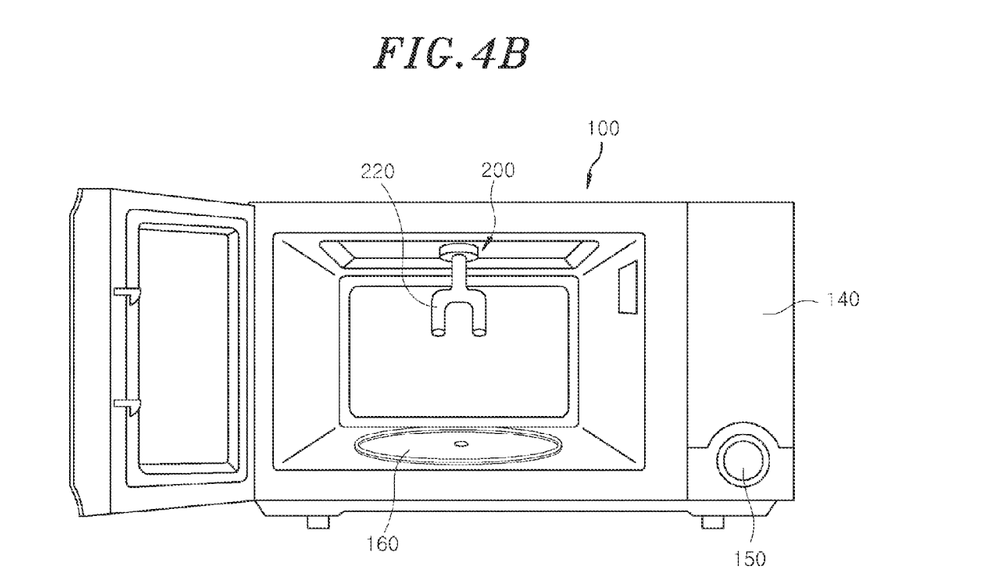
Figure 4C:
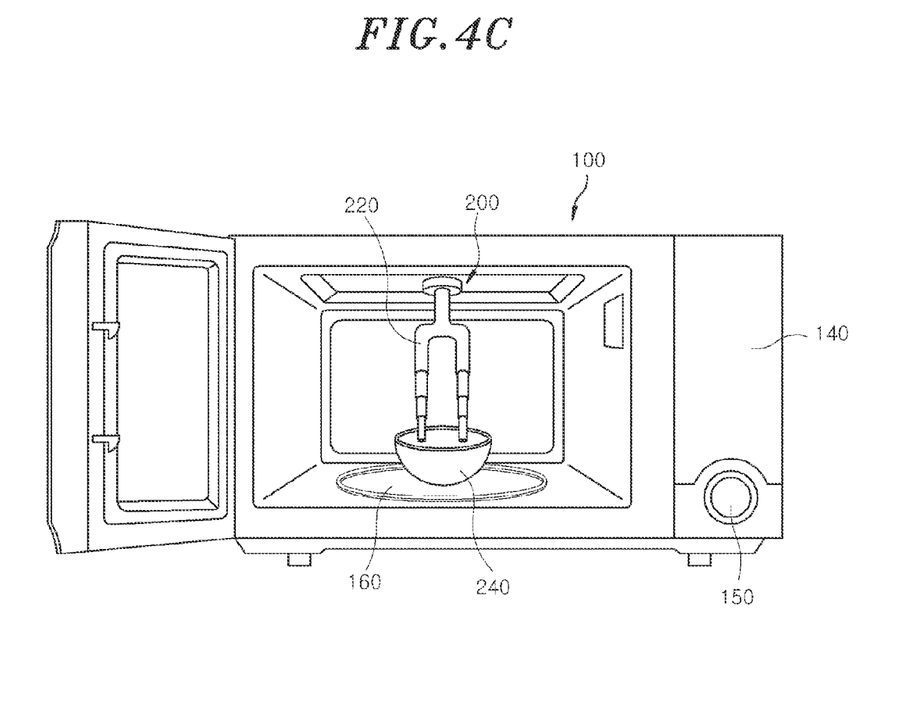

FIGS. 4A to 4C depict length-adjustable heating bars included in a microwave oven in accordance with one or more embodiments of the present invention.

Referring to FIG. 4A, the heating bar 220 in accordance with one or more embodiments of the present invention may be configured to have an adjustable length. For example, the heating bar 220 may be extendable, like an antenna of a television or automobile. To this end, the heating bar 220 may comprise a plurality of coaxially aligned cylindrical sections. In one or more embodiments, the first cylindrical section is concentric with and/or slidable into a second cylindrical section, the second cylindrical section is concentric with and/or slidable into a third cylindrical section, and so forth. In one or more embodiments, the diameter of the first cylindrical section is smaller than that of the second cylindrical section, the diameter of the second cylindrical section is smaller than that of the third cylindrical section, and so forth.

The length of the heating bar 220 can be adjusted so that food contained in a heating vessel 240 can be in direct contact with the electrodes 224 and 225 of the heating bar 220. Referring to FIG. 4B, before or after heating the food, the heating bar 220 is retracted, so that the heating vessel 240 can be put into the microwave oven 100 and/or taken out of the microwave oven 100, respectively. Also, referring to FIG. 4C, the electrodes of the heating bar 200 are extended after the heating vessel 240 is put into the microwave oven 100, thereby facilitating a heating of the food (e.g., 230 in FIG. 2A).

In this regard, the heating bar 220 may be retracted and extended manually by the user. Alternatively, the heating bar 220 may be automatically retracted or extended by manipulating a button (not shown) on the control panel 140.

While the foregoing embodiment has been described showing that the length of the heating bar 220 may be adjusted in accordance with the configuration illustrated in FIG. 4A, it is not intended to exclude other types of adjustment of the length of the heating bar 220.

Figure 5:
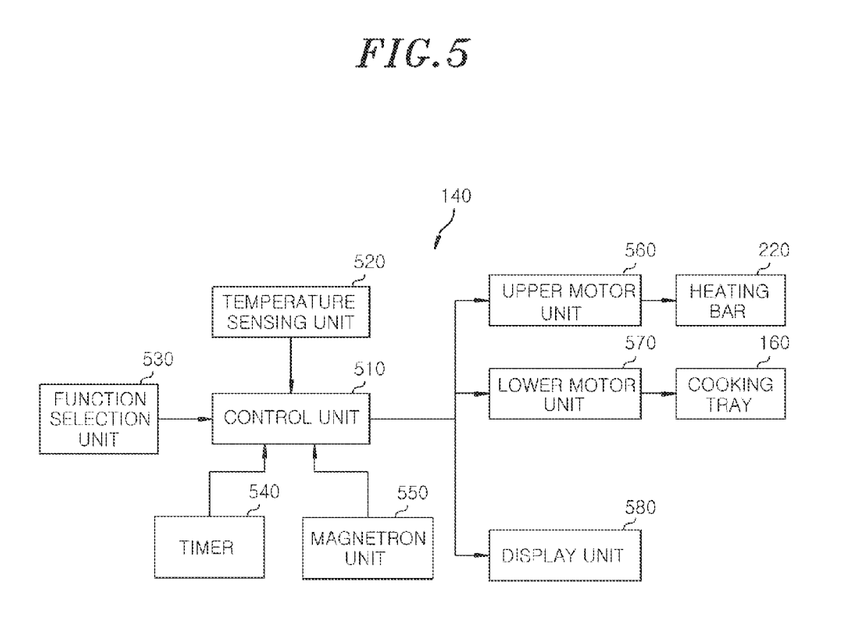
FIG. 5 is a block diagram of a control panel in accordance with one or more embodiments of the present invention.

FIG. 5 is a block diagram of a control panel in accordance with one or more embodiments of the present invention.

With reference to FIG. 5, the control panel 140 may include a control unit 510 that controls overall functions of the control panel 140, a temperature sensing unit (e.g., a temperature sensor) 520 that senses a temperature inside the microwave oven 100, a function selection unit 530 that selects various functions of the microwave oven 100, a timer 540 that controls an operating time and/or delay time of the microwave oven 100, a display 580 that displays operating states of the microwave oven 100, a magnetron 550 that generates electromagnetic waves, and a lower motor 570 that rotates the cooking tray 160.

The control unit 510, the temperature sensing unit 520, the function selection unit 530, the timer 540, the display 580, the magnetron 550, and the lower motor 580 are commonly employed components of a typical microwave oven and therefore, a detailed description of these components will be omitted for the sake of simplicity of the disclosure.

The control panel 140 may further include an upper motor 560 capable of rotating the heating bar 220. When the upper motor 560 is driven by the control unit 510, the heating bar 220 can rotate. The rotation of the heating bar 220 facilitates more uniform heating of food 230. The same or a different motor can extend and retract the heating bar(s) 220 (see FIGS. 4A-C).

The upper motor 560 may be controlled to rotate at an angular speed in the same direction as the driving direction of the lower motor 570, or may be controlled to rotate at an angular speed in a direction opposite to the driving direction of the lower motor. In addition, it is also possible to rotate either one of the upper motor 560 and the lower motor 570.

On the other hand, the function selection unit 530 may include a button for selecting at least one of the dielectric heating or the ohmic heating. When a user operates the button, one of the dielectric heating or the ohmic heating may be selected to heat the food to be heated. Alternatively, when a user operates the button, it is possible to control the microwave oven to heat the food by both dielectric heating and ohmic heating at the same time.

As mentioned above, the microwave oven in accordance with one or more embodiments of the present invention may perform ohmic-heating of food to be heated using the ohmic heating unit having the heating bar. Consequently, the food to be heated may be uniformly heated by ohmic heating.

As set forth above, the present invention has been described in connection with specific embodiments of the microwave oven. However, they are only examples and the present invention is not limited thereto, and it should be construed that the present invention has the widest scope in compliance with the basic idea disclosed in the disclosure. Although it is possible for those skilled in the art to combine and substitute the disclosed embodiments to implement other types of microwave ovens that are not specifically disclosed in the disclosure, they do not depart from the scope of the present invention. In addition, it will be apparent to those skilled in the art that various modifications and changes may be made with respect to the disclosed embodiments based on the disclosure and that these changes and modifications also fall within the scope of the present invention.

What is claimed is:

1. A microwave oven, comprising:
an integrated multi-prong shaped heating bar including a first electrode, a second electrode and an electrode insulator, wherein the first electrode and the second electrode are isolated from each other by the electrode insulator which is interposed between the first electrode and the second electrode; and
a power supply electrically connected to each of the first and the second electrodes
wherein the power supply provides the heating bar with electric current through the first electrode and second electrodes, the heating bar applies the received electric current to food and the electric current applied by the heating bar passes through the food.

2. The microwave oven of claim 1, wherein the heating bar contacts the food by extending a length of the heating bar, or does not contact the food by reducing the length of the heating bar.

3. The microwave oven of claim 1, wherein the heating bar comprises a plurality of electrodes.

4. The microwave oven of claim 1, wherein the heating bar comprises electrodes that are extendable and/or retractable.

5. The microwave oven of claim 1, further comprising: a magnetron configured to generate microwaves.

6. The microwave oven of claim 5, configured to heat the food using at least one of ohmic heating whereby the electric current passes through the food, and dielectric heating, whereby the magnetron irradiates the food with electromagnetic waves.

7. The microwave oven of claim 6, configured to apply both ohmic heating and dielectric heating to the food.

8. The microwave oven of claim 7, further comprising: an input unit configured to select at least one of the ohmic heating and the dielectric heating.

9. The microwave oven of claim 1, further comprising:
a first motor configured to rotate the heating bar; and
an optional second motor configured to extend and retract the heating bar.

10. The microwave oven of claim 9, further comprising: a cooking tray configured to rotate the food.

11. The microwave oven of claim 10, wherein the cooking tray is configured to rotate at a same angular speed as the heating bar.

12. The microwave oven of claim 10, wherein the cooking tray is configured to rotate in the direction opposite to the rotation direction of the heating bar.

13. A method for operating an oven, comprising:
in a first mode:
   receiving electric current from a power supply, the power supply electrically connected to a first electrode and a second electrode of an integrated multi-prong shaped heating bar, the heating bar comprising the first electrode and second electrodes and an electrode insulator, wherein the first electrode and the second electrode are isolated from each other by the electrode insulator which is interposed between the first electrode and the second electrode; and
   applying the electric current to food, wherein the electric current is applied to the food by the heating bar, and in a second mode, irradiating the food with electromagnetic waves, wherein the power supply provides the heating bar with electric current through the first electrode and second electrodes, the heating bar applies the received electric current to food and the electric current applied by the heating bar passes through the food.

14. The method of claim 13, wherein applying the electric current further comprises extending the heating bar until the heating bar contacts the food.

15. The method of claim 13, wherein the first mode comprises ohmic heating and the second mode comprises dielectric heating.

16. The method of claim 13, further comprising selecting at least one of the first mode and the second mode.

17. The method of claim 13, further comprising rotating the heating bar in the first mode.

18. The method of claim 17, further comprising: rotating a cooking tray containing the food.

19. The method of claim 18, wherein rotating the cooking tray and rotating the heating bar comprise rotating the cooking tray at a same angular speed as the heating bar.

20. The method of claim 18, wherein the cooking tray is rotated in a direction opposite to the heating bar.

* * * * *